United States Patent
Chung et al.

(10) Patent No.: US 12,292,630 B2
(45) Date of Patent: May 6, 2025

(54) DISPLAY PANEL WITH SWITCHABLE WIDE AND NARROW VIEWING ANGLES, DRIVING METHOD AND DISPLAY DEVICE

(71) Applicant: Infovision Optoelectronics (Kunshan) Co., LTD., Suzhou (CN)

(72) Inventors: Te-Chen Chung, Suzhou (CN); Jiajun Shen, Suzhou (CN); Limei Jiang, Suzhou (CN); Jun Jiang, Suzhou (CN)

(73) Assignee: INFOVISION OPTOELECTRONICS (KUNSHAN) CO., LTD., Suzhou (CN)

( * ) Notice: Subject to any disclaimer, the term of this patent is extended or adjusted under 35 U.S.C. 154(b) by 0 days.

(21) Appl. No.: 18/575,843

(22) PCT Filed: Apr. 6, 2022

(86) PCT No.: PCT/CN2022/085258
§ 371 (c)(1),
(2) Date: Dec. 30, 2023

(87) PCT Pub. No.: WO2023/193132
PCT Pub. Date: Oct. 12, 2023

(65) Prior Publication Data
US 2024/0369868 A1  Nov. 7, 2024

(51) Int. Cl.
*G02F 1/13* (2006.01)
*G02F 1/133* (2006.01)
*G02F 1/1335* (2006.01)
*G02F 1/1343* (2006.01)

(52) U.S. Cl.
CPC ........ *G02F 1/1323* (2013.01); *G02F 1/13306* (2013.01); *G02F 1/133514* (2013.01); *G02F 1/133531* (2021.01); *G02F 1/134309* (2013.01)

(58) Field of Classification Search
CPC .............. G02F 1/1323; G02F 1/34309; G02F 2201/122; G02F 2201/123
See application file for complete search history.

(56) References Cited

U.S. PATENT DOCUMENTS

2008/0272995 A1*  11/2008  Sakaguchi ............ G06F 1/1647
345/87

FOREIGN PATENT DOCUMENTS

| CN | 1702517 A | 11/2005 | |
| CN | 101097343 A | 1/2008 | |
| CN | 101151573 A | 3/2008 | |
| CN | 112198724 A * | 1/2021 | ........... G02F 1/1323 |

(Continued)

*Primary Examiner* — Jessica M Merlin
(74) *Attorney, Agent, or Firm* — Cheng-Ju Chiang

(57) ABSTRACT

A display panel with switchable wide and narrow viewing angles, a driving method, and a display device are provided. The display panel is provided with a patterned identification area and a non-identification area. The display panel includes a light adjusting box and a display box which are arranged in a stacked manner. The light adjusting box includes a first substrate, a second substrate and a first liquid crystal layer. The first substrate is provided with a common viewing angle electrode, the second substrate is provided with a first viewing angle electrode and a second viewing angle electrode matching the common viewing angle electrode, the first viewing angle electrode corresponds to the identification pattern area, and the second viewing angle electrode corresponds to the non-identification pattern area.

16 Claims, 13 Drawing Sheets

(56) References Cited

FOREIGN PATENT DOCUMENTS

| | | | |
|---|---|---|---|
| CN | 112540474 | A | 3/2021 |
| JP | 2005-292586 | A | 10/2005 |
| JP | 2006-64882 | A | 3/2006 |

\* cited by examiner

DISPLAY PANEL WITH SWITCHABLE WIDE AND NARROW VIEWING ANGLES, DRIVING METHOD AND DISPLAY DEVICE

CROSS REFERENCE TO RELATED APPLICATIONS

This application is a 35 U.S.C. § 371 National Phase conversion of International (PCT) Patent Application No. PCT/CN2022/085258, filed on Apr. 6, 2022, the disclosures of which are incorporated herein by reference in their entirety. The PCT International Patent Application was filed and published in Chinese.

BACKGROUND OF THE APPLICATION

Field of the Application

The present application relates to the technical field of display technology, and in particular, to a display panel with switchable wide and narrow viewing angles, a driving method and a display device.

Description of Related Art

With the continuous progress of LCD technology, the viewing angle of the display device has been widened from about 112° to more than 160°. While people enjoy the visual experience brought by wide viewing angle, they also hope to effectively protect business secrets and personal privacy, so as to avoid the commercial loss or embarrassment caused by the leakage of screen information. Therefore, in addition to the requirement of wide viewing angle, the display device is also required to have the function of switching between wide and narrow viewing angles in many occasions.

At present, the main way to switch between wide and narrow viewing angles is to attach a louver shielding film onto the display screen. When it is necessary to prevent peeping, the louver shielding film can be used to cover the screen to reduce the viewing angle. However, this method requires additional preparation of the louver shielding film, which will cause great inconvenience to users, and a louver shielding film can only achieve one viewing angle. Once the louver shielding film is attached, the viewing angle will be fixed in the narrow viewing angle mode. As a result, it is impossible to switch freely between the wide viewing angle mode and the narrow viewing angle mode, and the louver shielding film will reduce the brightness and the display effect.

The existing technology also uses a light adjusting box in combination with a display panel to switch between a wide viewing angle mode and a narrow viewing angle mode. The display panel is used for normal picture display. The light adjusting box is used to control the viewing angle switching. The light adjusting box includes a first substrate, a second substrate, and a liquid crystal layer arranged between the first substrate and the second substrate. The viewing angle control electrodes provided on the first substrate and the second substrate generate a vertical electric field on the liquid crystal molecules, so that the liquid crystal molecules deflect in a vertical direction, thereby realizing the narrow viewing angle mode. By controlling the voltages applied to the viewing angle control electrodes, it is thus possible to switch between a wide viewing angle mode and a narrow viewing angle mode.

BRIEF SUMMARY OF THE APPLICATION

Technical Problem

The display panel in the existing technology is only used for displaying pictures in a wide or narrow viewing angle mode. However, in the narrow viewing angle mode, it is unable for the display panel to not only see the picture display, but also highlight the LOGO (trademark) pattern of the product.

Technical Solution

In order to overcome the shortcomings and deficiencies in the existing technology, the object of the present application is to provide a display panel with switchable wide and narrow viewing angles, a driving method and a display device, so as to solve the problem that the display panel in the existing technology is unable to not only see the picture display, but also highlight the LOGO pattern at the same time in the narrow viewing angle mode.

The object of the present application is realized through the following technical solutions:

The present application provides a display panel with switchable wide and narrow viewing angles. The display panel is provided with a patterned identification area and a non-identification area, and the display panel includes a light adjusting box and a display box which are stacked with one on another;

the light adjusting box includes a first substrate, a second substrate arranged opposite to the first substrate and a first liquid crystal layer arranged between the first substrate and the second substrate. The side of the first substrate facing the first liquid crystal layer is provided with a common viewing angle electrode. The side of the second substrate facing the first liquid crystal layer is provided with a first viewing angle electrode and a second viewing angle electrode which are matched with the common viewing angle electrode. The first viewing angle electrode and the second viewing angle electrode are insulated and separated from each other. The first viewing angle electrode is located correspondingly in the identification area, and the second viewing angle electrode is located correspondingly in the non-identification area;

in the wide viewing angle mode, the first viewing angle electrode and the second viewing angle electrode are applied with electric signals with the same amplitude, and the light transmittance of the identification area and the non-identification area from the same side viewing angle is the same; in the narrow viewing angle mode, the first viewing angle electrode and the second viewing angle electrode are applied with electric signals with different amplitudes, and the light transmittance of the identification area and the non-identification area from the same side viewing angle is different.

Further, the identification area is located at the center of the display panel.

Further, the second viewing angle electrode is provided with an opening corresponding to the first viewing angle electrode, and the pattern of the opening is the same as that of the first viewing angle electrode.

Further, the second viewing angle electrode and the first viewing angle electrode are located on the same layer; or, the second viewing angle electrode and the first viewing angle electrode are located at different layers.

Further, there is a gap between the first viewing angle electrode and the second viewing angle electrode when projected on the second substrate.

Further, the first viewing angle electrode and the second viewing angle electrode when projected on the second substrate are partially overlapped.

Further, the first viewing angle electrode is a comb electrode, and the second viewing angle electrode is a comb electrode matched with the first viewing angle electrode in the area near the first viewing angle electrode.

Further, both the first viewing angle electrode and the second viewing angle electrode are block electrodes.

Further, the center of the first viewing angle electrode is a block electrode, the outer periphery of the first viewing angle electrode is a comb electrode, and the second viewing angle electrode is a comb electrode matched with the first viewing angle electrode in the area near the first viewing angle electrode.

Further, the light adjusting box is provided with a first signal line electrically connected with the common viewing angle electrode, a second signal line electrically connected with the first viewing angle electrode, and a third signal line electrically connected with the second viewing angle electrode, wherein the first signal line, the second signal line and the third signal line are all led out around the edges of the light adjusting box; or, the first signal line and the third signal line are both led out around the edges of the light adjusting box, and the second signal line is directly led out from the first viewing angle electrode.

Further, the display box includes a color film substrate, an array substrate arranged opposite to the color film substrate, and a second liquid crystal layer arranged between the color film substrate and the array substrate. A first polarizer is arranged on the side of the light adjusting box away from the display box, a second polarizer is arranged between the light adjusting box and the display box, and a third polarizer is arranged on the side of the display box away from the light adjusting box, wherein the light transmission axis of the first polarizer is parallel to the light transmission axis of the second polarizer, and the light transmission axis of the third polarizer is perpendicular to the light transmission axis of the second polarizer.

The present application also provides a driving method of a display panel with switchable wide and narrow viewing angles, wherein the driving method is configured for driving the display panel with switchable wide and narrow viewing angles as described above, and the driving method comprises:

in the wide viewing angle mode, a first electrical signal is applied to the common viewing angle electrode, and a second electrical signal is applied to both the first viewing angle electrode and the second viewing angle electrode, wherein the voltage difference between the second electrical signal and the first electrical signal is less than a first preset value or greater than a second preset value, and the light transmittance of the identification area and the non-identification area from the same side viewing angle is the same;

in the narrow viewing angle mode, a first electrical signal is applied to the common viewing angle electrode, a third electrical signal is applied to the first viewing angle electrode, and a fourth electrical signal is applied to the second viewing angle electrode, wherein the amplitudes of the third electrical signal and the fourth electrical signal are different, the voltage difference between the third electrical signal and the first electrical signal and the voltage difference between the fourth electrical signal and the first electrical signal are greater than a third preset value and less than a fourth preset value, and the light transmittance of the identification area and the non-identification area is different from the same side viewing angle;

wherein the second preset value is greater than the first preset value, the third preset value is greater than or equal to the first preset value, and the fourth preset value is less than or equal to the second preset value.

Further, the first electrical signal and the second electrical signal are both 0V DC voltage.

Further, the amplitudes of the third electrical signal and the fourth electrical signal are 1.6V-2.4V.

Further, the third electrical signal and the fourth electrical signal are both AC voltages.

Further, the amplitude difference between the third electrical signal and the fourth electrical signal is 0.2V-0.5V.

The present application also provides a display device including the display panel with switchable wide and narrow viewing angles as described above.

Beneficial Effects

The first viewing angle electrode and the second viewing angle electrode are provided in the light adjusting box, and the first viewing angle electrode is a patterned structure. In the narrow viewing angle mode, the first viewing angle electrode and the second viewing angle electrode are applied with electric signals with different amplitudes, the light transmittance of the identification area and the non-identification area is different from the same side viewing angle, such that the brightness of the identification area and the non-identification area is different from the same side viewing angle, the LOGO pattern in the corresponding identification area, namely the trademark pattern, can be seen from the side viewing angle, so as to enhance the brand effect. However, the brightness difference between the identification area and the non-identification area is not obvious from the front viewing angle, and the normally displayed picture can be seen.

DETAILED DESCRIPTION OF THE APPLICATION

In order to further illustrate the technical solutions and effects of the present application to achieve its intended purpose, the following describes the specific implementation mode, structures, features and effects of the display panel with switchable wide and narrow viewing angles, the driving method and the display device provided by the present application in combination with the drawings and preferred embodiments as follows.

Figure 1:
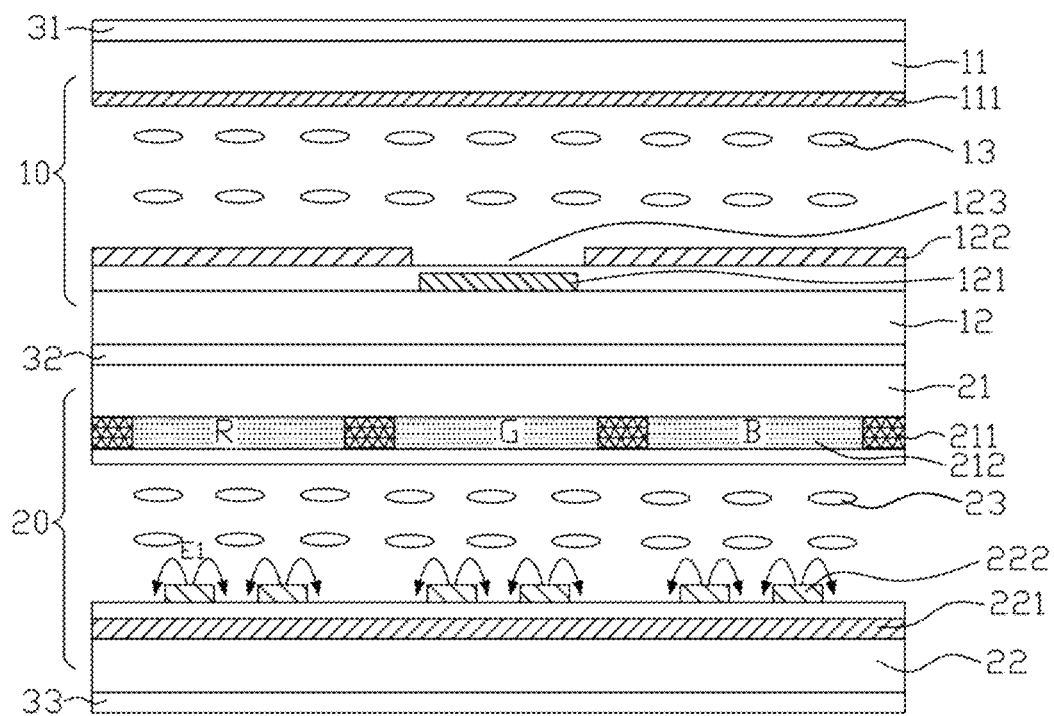
FIG. 1 is a schematic diagram of the structure of the display panel of the present application in the wide viewing angle mode.
Figure 2:
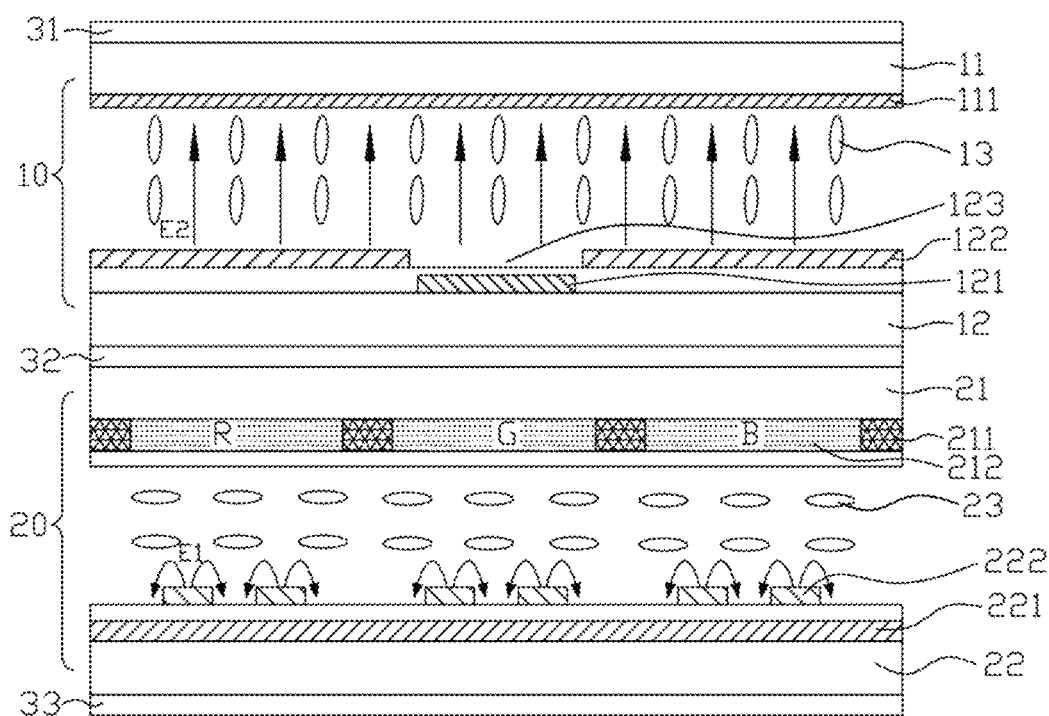
FIG. 2 is another schematic diagram of the structure of the display panel of the present application in the wide viewing angle mode.
Figure 3:
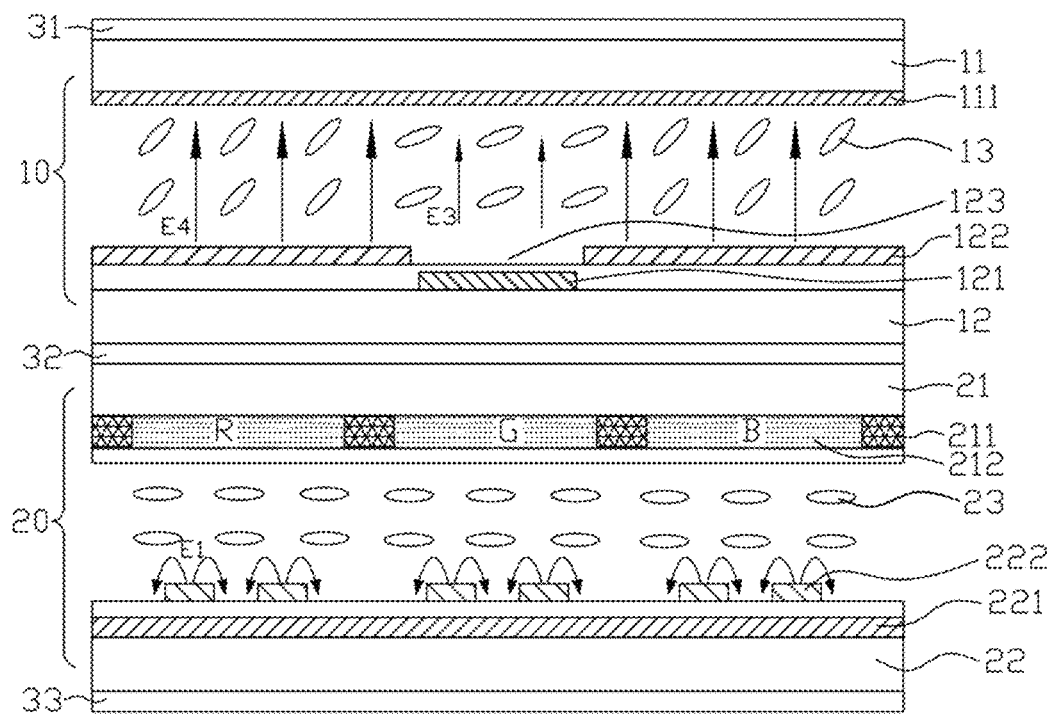
FIG. 3 is a schematic diagram of the structure of the display panel of the present application in the narrow viewing angle mode.
Figure 4:
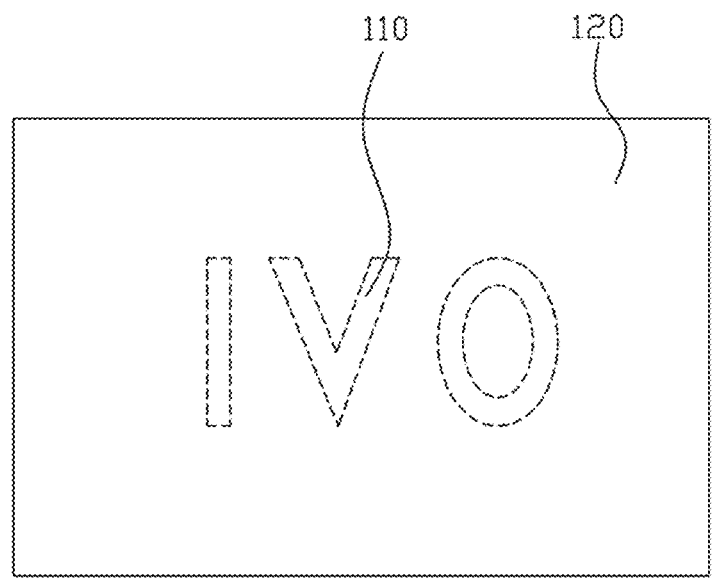
FIG. 4 is a schematic plan view of the display panel of the present application.
Figure 5:
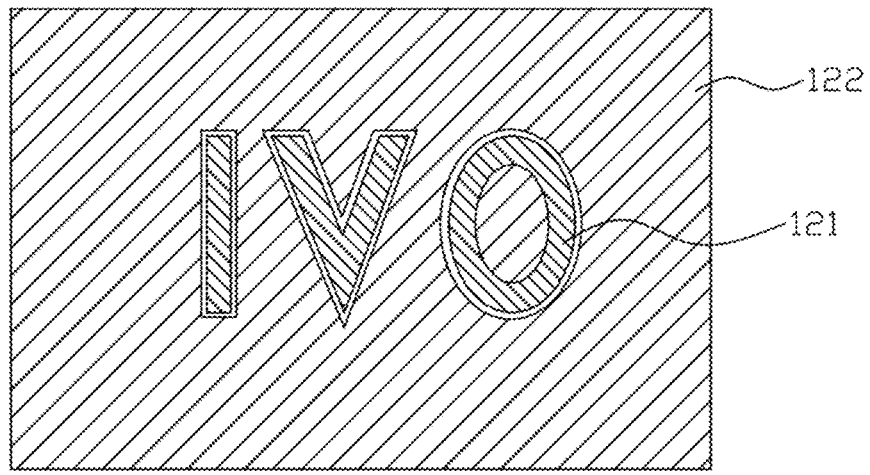
FIG. 5 is a schematic plan view of the second substrate in the present application.

FIG. 1 is a schematic diagram of the structure of the display panel of the present application in the wide viewing angle mode; FIG. 2 is another schematic diagram of the structure of the display panel of the present application in the wide viewing angle mode; FIG. 3 is a schematic diagram of the structure of the display panel of the present application in the narrow viewing angle mode; FIG. 4 is a schematic plan view of the display panel of the present application; and FIG. 5 is a schematic plan view of the second substrate in the present application.

As shown in FIGS. 1 to 5, the present application provides a display panel with switchable wide and narrow viewing angles. The display panel is provided with a patterned identification area 110 and a non-identification area 120 (see FIG. 4). The pattern of the identification area 110 can be set according to the actual LOGO pattern to be displayed (in this embodiment, the letter "IVO" is used as the LOGO pattern to be displayed in the identification area 110). The display panel includes a light adjusting box 10 and a display box 20 which are stacked with one on another. In this embodiment, the light adjusting box 10 is arranged above the display box 20, that is, the light adjusting box 10 is located at the light exit side of the display box 20. The light adjusting box 10 is used to control the viewing angle of the display panel. The display box 20 is used to control the display of normal picture on the display panel. Of course, the light adjusting box 10 may also be arranged below the display box 20, that is, the light adjusting box 10 is located at the light incident side of the display box 20.

The light adjusting box 10 includes a first substrate 11, a second substrate 12 arranged opposite to the first substrate 11, and a first liquid crystal layer 13 arranged between the first substrate 11 and the second substrate 12. The side of the first substrate 11 facing the first liquid crystal layer 13 is provided with a common viewing angle electrode 111. The side of the second substrate 12 facing the first liquid crystal layer 13 is provided with a first viewing angle electrode 121 and a second viewing angle electrode 122 which are matched with the common viewing angle electrode 111. The first viewing angle electrode 121 and the second viewing angle electrode 122 are insulated and separated from each other. The deflection of the liquid crystal molecules in the first liquid crystal layer 13 is controlled by regulating the voltage difference between the common viewing angle electrode 111 and the first viewing angle electrode 121 and the voltage difference between the common viewing angle electrode 111 and the second viewing angle electrode 122, so as to realize the switching between wide and narrow viewing angles. The first viewing angle electrode 121 is located correspondingly in the identification area 110, and the second viewing angle electrode 122 is located correspondingly in the non-identification area 120.

The first liquid crystal layer 13 preferably uses positive liquid crystal molecules, i.e., liquid crystal molecules with positive dielectric anisotropy. The phase delay of the first liquid crystal layer 13 is preferably 700 nm, and the optional range is 500 nm<phase delay<1000 nm. In the initial state, the positive liquid crystal molecules in the first liquid crystal layer 13 are aligned parallel to the first substrate 11 and the second substrate 12. The alignment direction of the positive liquid crystal molecules on the side near the first substrate 11 is parallel or reverse to the alignment direction of the positive liquid crystal molecules on the side near the second substrate 12, so that the light adjusting box 10 has a wide viewing angle in the initial state, as shown in FIG. 1. When it is necessary to realize narrow viewing angle display, control voltages are respectively applied to the common viewing angle electrode 111, the first viewing angle electrode 121 and the second viewing angle electrode 122, so that a large voltage difference and a strong electric field are formed between the common viewing angle electrode 111 and the first viewing angle electrode 121, and between the common viewing angle electrode 111 and the second viewing angle electrode 122, so as to drive the positive liquid crystal molecules in the first liquid crystal layer 13 to deflect in a vertical direction, so that the light adjusting box 10 has a narrow viewing angle, as shown in FIG. 3.

In this embodiment, the display box 20 is preferably a liquid crystal display box. Of course, in other embodiments, the display box 20 may also be a self-illuminated display (such as OLED display, Micro LED display), but in this case, the light adjusting box 10 needs to be set above the display box 20.

The display box 20 includes a color film substrate 21, an array substrate 22 arranged opposite to the color film substrate 21, and a second liquid crystal layer 23 arranged between the color film substrate 21 and the array substrate 22. The second liquid crystal layer 23 preferably uses positive liquid crystal molecules, i.e., liquid crystal molecules with positive dielectric anisotropy. In the initial state, the positive liquid crystal molecules in the second liquid crystal layer 23 are aligned parallel to the color film substrate 21 and the array substrate 22. The alignment direction of the positive liquid crystal molecules on the side near the color film substrate 21 is parallel or reverse to the alignment direction of the positive liquid crystal molecules on the side near the array substrate 22. Of course, in other embodiments, the second liquid crystal layer 23 may also use negative liquid crystal molecules. The negative liquid crystal molecules in the second liquid crystal layer 23 may be aligned perpendicular to the color film substrate 21 and the array substrate 22, which is similar to the alignment direction of the VA display mode.

Further, a first polarizer 31 is arranged on the side of the light adjusting box 10 away from the display box 20, a second polarizer 32 is arranged between the light adjusting box 10 and the display box 20, and a third polarizer 33 is arranged on the side of the display box 20 away from the light adjusting box 10. The light transmission axis of the first polarizer 31 is parallel to the light transmission axis of the second polarizer 32, and the light transmission axis of the third polarizer 33 is perpendicular to the light transmission axis of the second polarizer 32.

The alignment direction of the first liquid crystal layer 13 may be perpendicular to the light transmission axis of the first polarizer 31 and the second polarizer 32, for example, the light transmission axis of the first polarizer 31 and the second polarizer 32 is 0°, and the alignment direction of the first liquid crystal layer 13 is 90°. Of course, the alignment direction of the first liquid crystal layer 13 may also be parallel to the light transmission axis of the first polarizer 31 and the second polarizer 32, for example, the light transmission axis of the first polarizer 31 and the second polarizer 32 is 90°, and the alignment direction of the first liquid crystal layer 13 is 90°.

The color film substrate 21 is provided with a color resistance layer 212 arranged in an array and a black matrix 211 used for separating the color resistance layer 212. The color resistance layer 212 includes red (R), green (G) and blue (B) color resistance materials, and correspondingly forms red (R), green (G) and blue (B) sub-pixels.

On the side facing the second liquid crystal layer 23, the array substrate 22 is provided with a plurality of scanning lines (not shown) and a plurality of data lines (not shown), which are insulated and intersected to form a plurality of pixel units. A pixel electrode 222 and a thin film transistor (not shown) are provided in each pixel unit, and through the thin film transistor, the pixel electrode 222 is electrically connected with the data line adjacent to the thin film transistor. The thin film transistor includes a gate, an active layer, a drain and a source. The gate and the scanning line are located on the same layer and electrically connected. The gate and the active layer are separated by an insulating layer. The source and the data line are electrically connected. The drain and the pixel electrode 222 are electrically connected through a contact hole.

As shown in FIG. 1, in this embodiment, the side of the array substrate 22 facing the second liquid crystal layer 23 is also provided with a common electrode 221. The common electrode 221 and the pixel electrode 222 are located at different layers and are insulated by an insulating layer. The common electrode 221 may be located above or below the pixel electrode 222 (as shown in FIG. 1, the common electrode 221 is located below the pixel electrode 222). Preferably, the common electrode 221 is a planar electrode set on the whole surface of the array substrate 22, and the pixel electrode 222 is a block electrode or a slit electrode with multiple electrode strips set in each pixel unit, so as to form a fringe field switching (FFS) mode. Of course, in other embodiments, the pixel electrode 222 and the common electrode 221 may be located on the same layer, but they are insulated and separated from each other. The pixel electrode 222 and the common electrode 221 may each include multiple electrode strips. The electrode strips of the pixel electrode 222 and the electrode strips of the common electrode 221 are alternately arranged, so as to form an in-plane switching (IPS) mode. Optionally, in other embodiments, the side of the array substrate 22 facing the second liquid crystal layer 23 is provided with pixel electrodes 222, and the side of the color film substrate 21 facing the second liquid crystal layer 23 is provided with a common electrode 221, so as to form the TN mode or VA mode.

Specifically, the first substrate 11, the second substrate 12, the color film substrate 21 and the array substrate 22 may be made of glass, acrylic acid, or polycarbonate, etc. The material of the common viewing angle electrode 111, the first viewing angle electrode 121, the second viewing angle electrode 122, the common electrode 221 and the pixel electrode 222 may be indium tin oxide (ITO), or indium zinc oxide (IZO), etc.

In this embodiment, as shown in FIG. 4, the identification area 110 is located at the center of the display panel, and other areas of the display panel except for the identification area 110 is the non-identification area 120. Of course, the location of the identification area 110 can also be set according to the location of the LOGO pattern to be displayed.

Further, the second viewing angle electrode 122 is provided with an opening 123 corresponding to the first viewing angle electrode 121. The pattern of the opening 123 is the same as that of the first viewing angle electrode 121, so that the first viewing angle electrode 121 can form a vertical electric field with the common viewing angle electrode 111, and the second viewing angle electrode 122 is prevented from shielding the signal of the first viewing angle electrode 121.

In this embodiment, the second viewing angle electrode 122 and the first viewing angle electrode 121 are located at different layers, and the second viewing angle electrode 122 and the first viewing angle electrode 121 are separated from each other by an insulating layer to avoid the risk of short circuit between the second viewing angle electrode 122 and the first viewing angle electrode 121. However, when the second viewing angle electrode 122 and the first viewing angle electrode 121 are located in different layers, there may be difference in reflectivity, thus it may cause the LOGO pattern to be seen from the front viewing angle.

Figure 27:
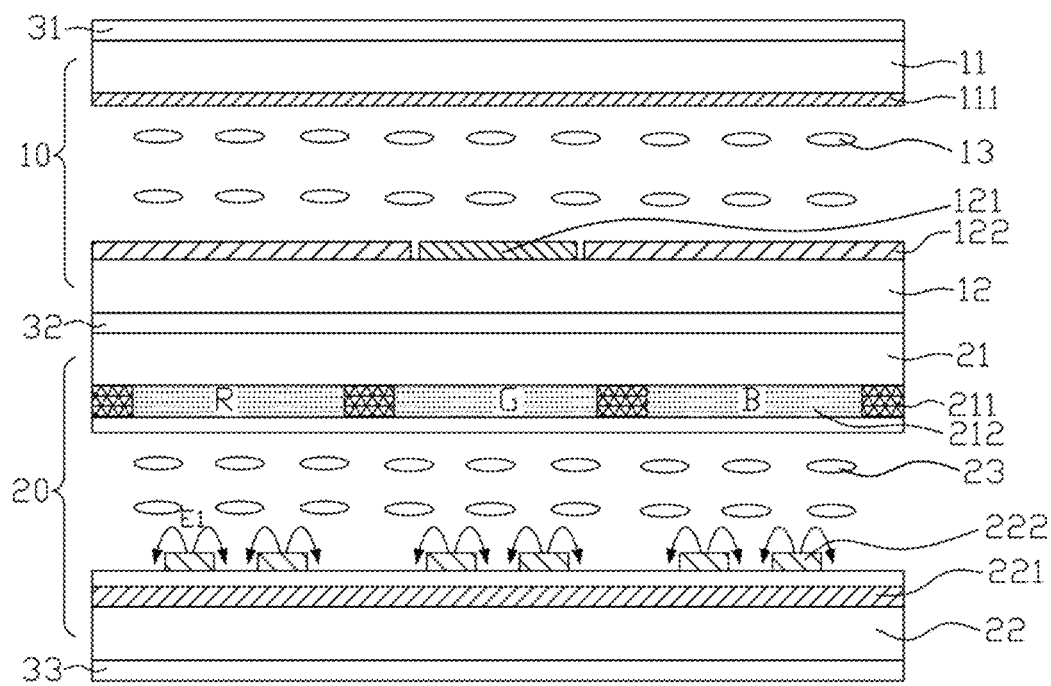
FIG. 27 is a schematic diagram of the structure of the display panel in another embodiment of the present application in the wide viewing angle mode.

FIG. 27 is a schematic diagram of the structure of the display panel in another embodiment of the present application in the wide viewing angle mode.

In other embodiments, as shown in FIG. 27, the second viewing angle electrode 122 and the first viewing angle electrode 121 may be located on the same layer, and the second viewing angle electrode 122 and the first viewing angle electrode 121 are insulated and separated from each other. The second viewing angle electrode 122 and the first viewing angle electrode 121 are located on the same layer, so as to avoid the difference in reflectivity between the second viewing angle electrode 122 and the first viewing angle electrode 121 and achieve a better effect from the front viewing angle. However, there may be a risk of short circuit between the second viewing angle electrode 122 and the first viewing angle electrode 121.

Figure 6A:
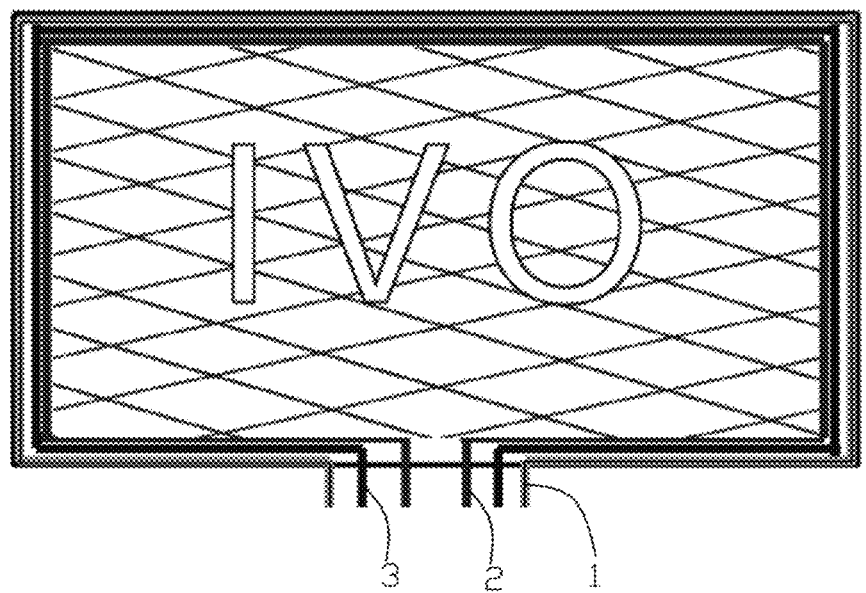
FIG. 6(a) is a schematic diagram of the signal lines of the display panel of the present application.
Figures 6B, 7, 8:
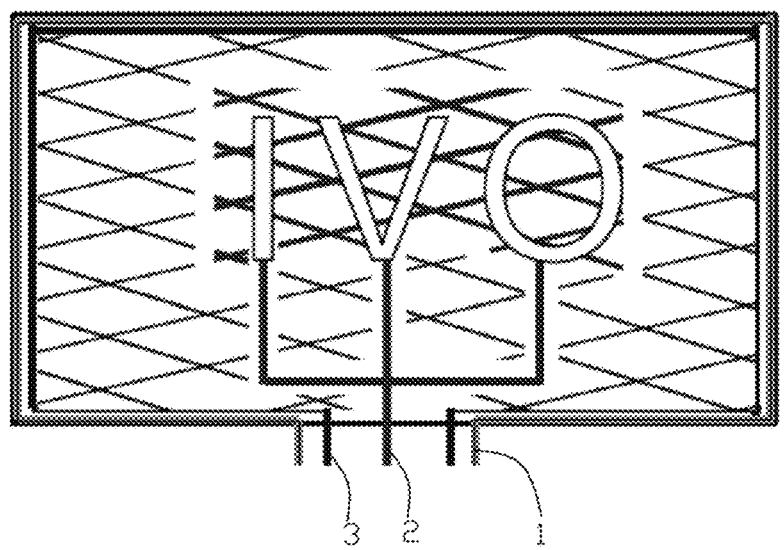
FIG. 6(b) is another schematic diagram of the signal lines of the display panel of the present application.
FIG. 7 is a schematic diagram of the signal waveform of the display panel of the present application in the wide viewing angle mode.
FIG. 8 is a schematic diagram of the signal waveform of the display panel of the present application in the narrow viewing angle mode.

FIG. 6(a) is a schematic diagram of the signal lines of the display panel of the present application, and FIG. 6(b) is another schematic diagram of the signal lines of the display panel of the present application.

Further, as shown in FIG. 6(a) and FIG. 6(b), the light adjusting box 10 is provided with a first signal line 1 electrically connected with the common viewing angle electrode 111, a second signal line 2 electrically connected with the first viewing angle electrode 121, and a third signal line 3 electrically connected with the second viewing angle electrode 122. As shown in FIG. 6(a), the first signal line 1, the second signal line 2 and the third signal line 3 are all led out around the edges of the light adjusting box 10; optionally, as shown in FIG. 6(b), the first signal line 1 and the third signal line 3 are both led out around the edges of the light adjusting box 10, but the second signal line 2 is directly led out from the first viewing angle electrode 121 for saving the peripheral space.

Figure 11:
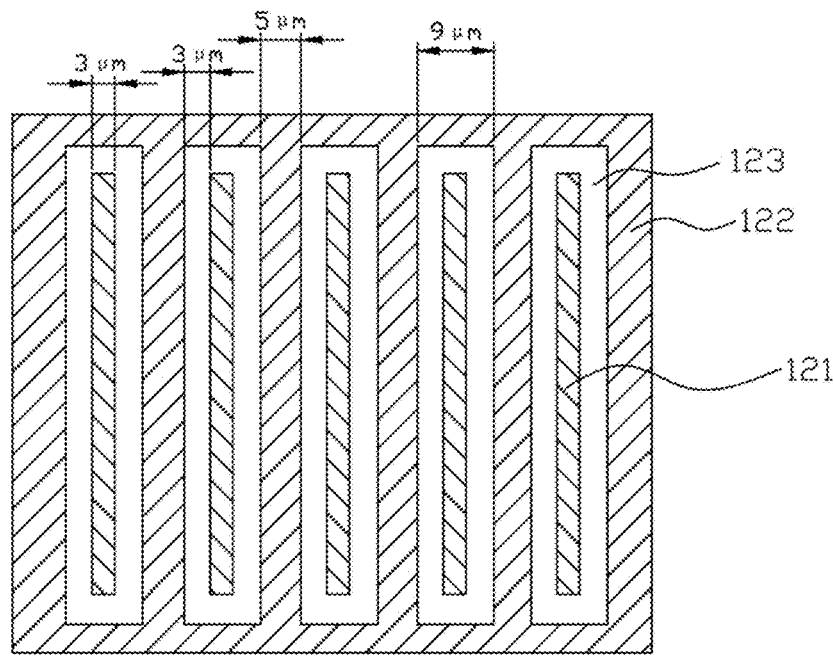
FIG. 11 is a first schematic plan view of the first viewing angle electrode and the second viewing angle electrode in the present application.
Figure 14:
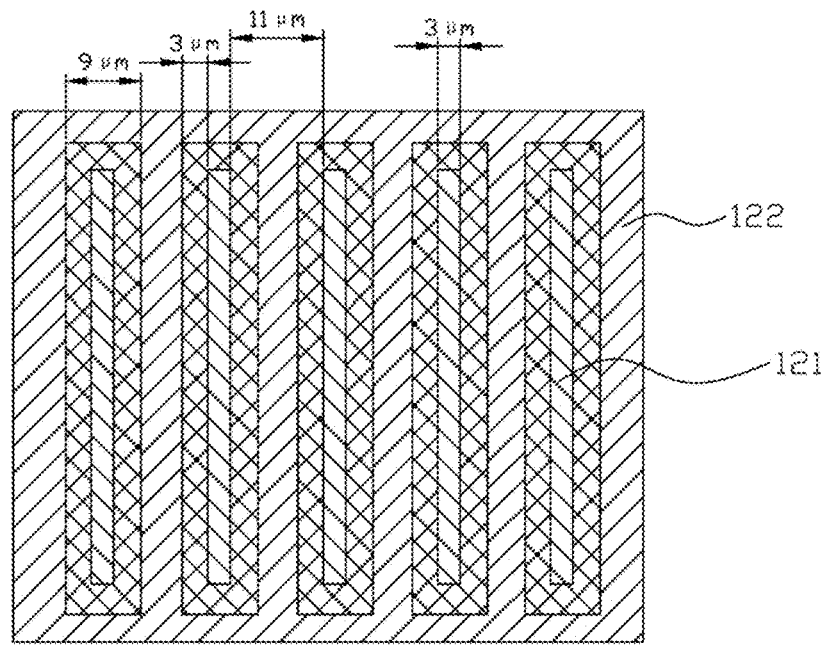
FIG. 14 is a second schematic plan view of the first viewing angle electrode and the second viewing angle electrode in the present application.
Figure 17:
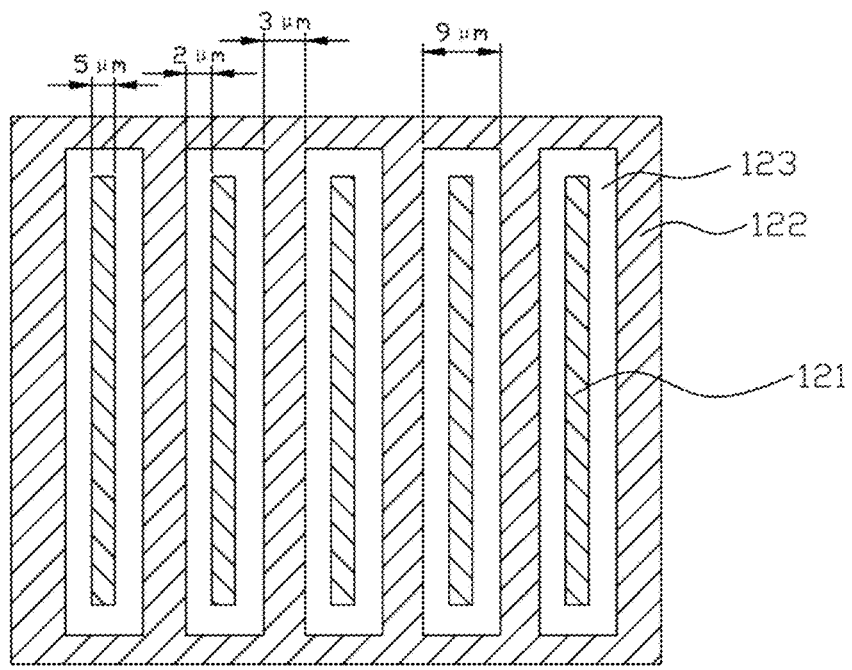
FIG. 17 is a third schematic plane view of the first viewing angle electrode and the second viewing angle electrode in the present application.

FIG. 11 is a first schematic plan view of the first viewing angle electrode and the second viewing angle electrode in the present application; FIG. 14 is a second schematic plan view of the first viewing angle electrode and the second viewing angle electrode in the present application; FIG. 17 is a third schematic plane view of the first viewing angle electrode and the second viewing angle electrode in the present application; and FIG. 20 is a fourth schematic plan view of the first viewing angle electrode and the second viewing angle electrode in the present application.

Figure 20:
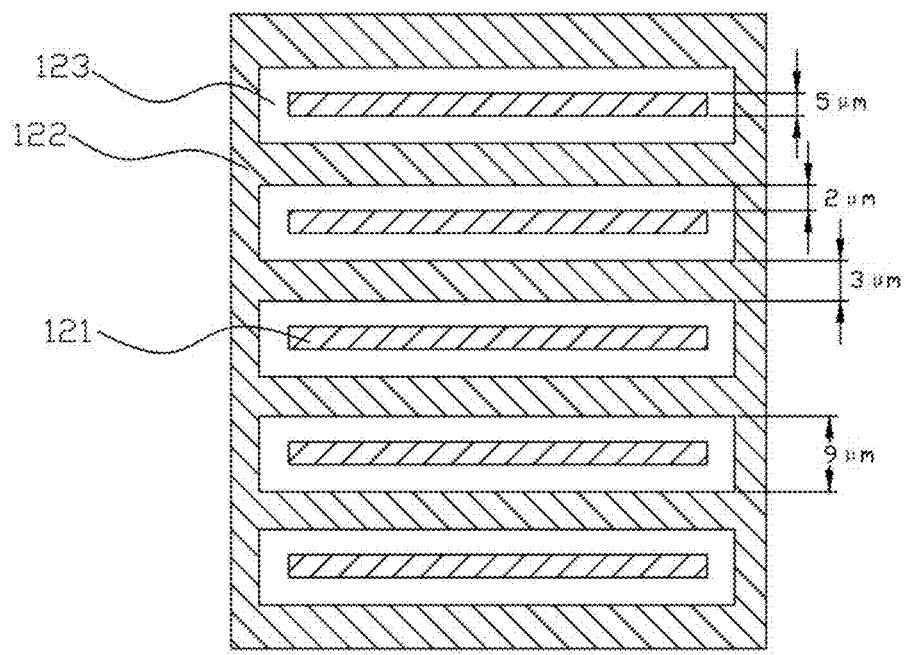
FIG. 20 is a fourth schematic plan view of the first viewing angle electrode and the second viewing angle electrode in the present application.

In one of the embodiments, as shown in FIGS. 11, 14, 17 and 20, the first viewing angle electrode 121 is a comb electrode, that is, the overall pattern of the first viewing angle electrode 121 is the same as the LOGO pattern, but the first viewing angle electrode 121 is a comb electrode composed of multiple electrode strips. The second viewing angle electrode 122 is a comb electrode matched with the first viewing angle electrode 121 in the area near the first viewing angle electrode 121. However, the second viewing angle electrode 122 may be a block electrode in the area far away from the first viewing angle electrode 121, and of course, the entire second viewing angle electrode 122 may be a comb electrode. The first viewing angle electrode 121 may be either a longitudinal comb electrode as shown in FIGS. 11, 14 and 17, or a transverse comb electrode as shown in FIG. 20.

Figure 23:
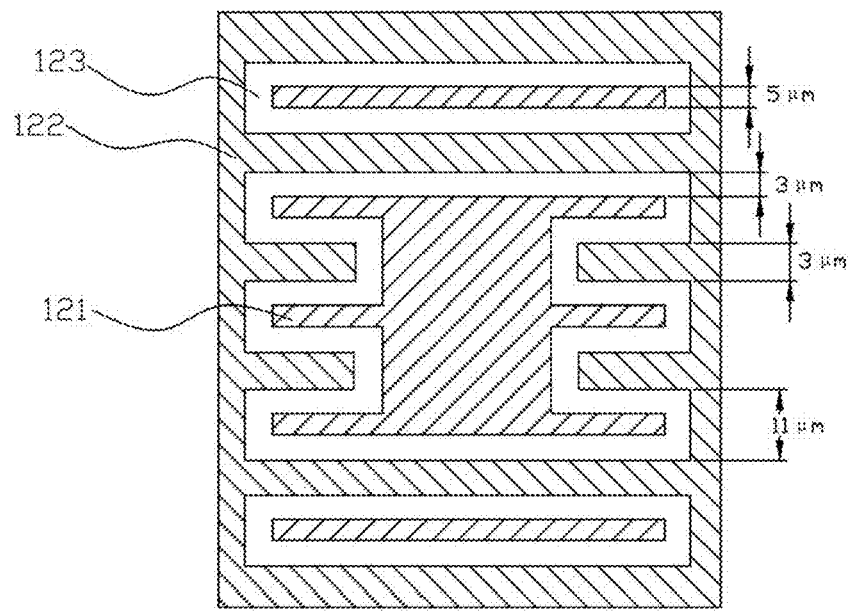
FIG. 23 is a fifth schematic plan view of the first viewing angle electrode and the second viewing angle electrode in the present application.

FIG. 23 is a fifth schematic plan view of the first viewing angle electrode and the second viewing angle electrode in the present application.

In another embodiment, as shown in FIG. 23, the center of the first viewing angle electrode 121 is a block electrode, and the outer periphery of the first viewing angle electrode 121 is a comb electrode, that is, the overall pattern of the first viewing angle electrode 121 is the same as the LOGO pattern, but the first viewing angle electrode 121 is composed of a block electrode and a plurality of electrode strips. The second viewing angle electrode 122 is a comb electrode matched with the first viewing angle electrode 121 in the area near the first viewing angle electrode 121. However, the second viewing angle electrode 122 may be a block electrode in the area far away from the first viewing angle electrode 121, and of course, the entire second viewing angle electrode 122 may be a comb electrode.

In another embodiment, the first viewing angle electrode 121 and the second viewing angle electrode 122 may be block electrodes, that is, the first viewing angle electrode 121 is a block electrode that is the same as the LOGO pattern.

Figure 26:
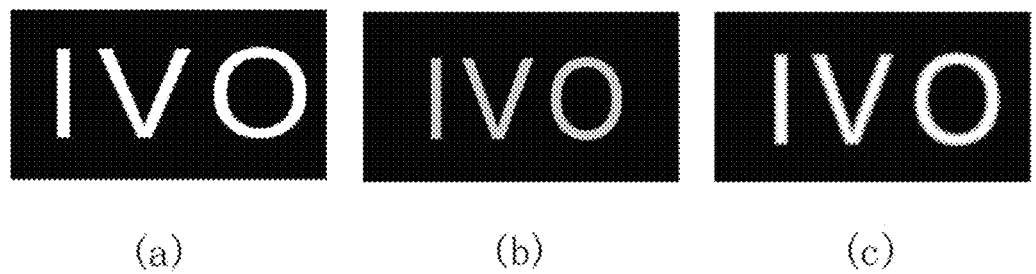
FIG. 26(a) is the display effect of the LOGO pattern when the first viewing angle electrode and the second viewing angle electrode have one shape in the present application.
FIG. 26(b) is the display effect of the LOGO pattern when the first viewing angle electrode and the second viewing angle electrode have another shape in the present application.
FIG. 26(c) is the display effect of the LOGO pattern when the first viewing angle electrode and the second viewing angle electrode have a further shape in the present application.

FIG. 26(a) is the display effect of the LOGO pattern when the first viewing angle electrode and the second viewing angle electrode have one shape in the present application; FIG. 26(b) is the display effect of the LOGO pattern when the first viewing angle electrode and the second viewing angle electrode have another shape in the present application; and FIG. 26(c) is the display effect of the LOGO pattern when the first viewing angle electrode and the second viewing angle electrode have a further shape in the present application.

As shown in FIGS. 26(a), 26(b) and 26(c), FIG. 26(a) is the simulation effect when the first viewing angle electrode 121 is a block electrode, FIG. 26(b) is the simulation effect when the first viewing angle electrode 121 is a comb electrode, and FIG. 26(c) is the simulation effect when the first viewing angle electrode 121 is composed of a block electrode at the center and a comb electrode at the outer periphery. It can be seen from FIGS. 26(a), 26(b) and 26(c) that the first viewing angle electrode 121 shown in FIG. 26(c) uses a comb-shaped electrode combined with a block-shaped electrode structure, which can achieve different gray scales to wrap the boundary of the LOGO from the side viewing angle, and can further enhance the display effect of the LOGO.

In one of the embodiments, as shown in FIGS. 11, 17, 20 and 23, there can be a gap between the first viewing angle electrode 121 and the second viewing angle electrode 122 when projected on the second substrate 12, that is, the width of the first viewing angle electrode 121 is less than the width of the opening 123. Preferably, the width of the first viewing angle electrode 121 is 2-6 µm. The width of the opening 123 is 3-10 µm. For example, as shown in FIG. 11, the width of the first viewing angle electrode 121 is 3 µm, the width of the opening 123 is 9 µm, the distance between two adjacent openings 123 is 5 µm, and the gap between the first viewing angle electrode 121 and the second viewing angle electrode 122 when projected on the second substrate 12 is 3 µm. As shown in FIGS. 17 and 20, the width of the first viewing angle electrode 121 is 5 µm, the width of the opening 123 is 9 µm, the distance between two adjacent openings 123 is 3 µm, and the gap between the first viewing angle electrode 121 and the second viewing angle electrode 122 when projected on the second substrate 12 is 2 µm. As shown in FIG. 23, the width of the comb electrode at the periphery of the first viewing angle electrode 121 is 5 µm, the width of the opening 123 corresponding to the comb electrode is 11 µm, the distance between two adjacent openings 123 is 3 µm, and the gap between the first viewing angle electrode 121 and the second viewing angle electrode 122 when projected on the second substrate 12 is 3 µm.

In another embodiment, as shown in FIG. 14, the first viewing angle electrode 121 and the second viewing angle electrode 122 when projected on the second substrate 12 are partially overlapped, that is, the width of the first viewing angle electrode 121 is greater than the width of the opening 123. Preferably, the width of the first viewing angle electrode 121 is 5-10 µm, and the width of the opening 123 is 3-5 µm. For example, as shown in FIG. 14, the width of the first viewing angle electrode 121 is 9 µm, the width of the opening 123 is 3 µm, the distance between two adjacent openings 123 is 11 µm, and the width of overlapping between the first viewing angle electrode 121 and the second viewing angle electrode 122 when projected on the second substrate 12 is 3 µm.

Figure 12:
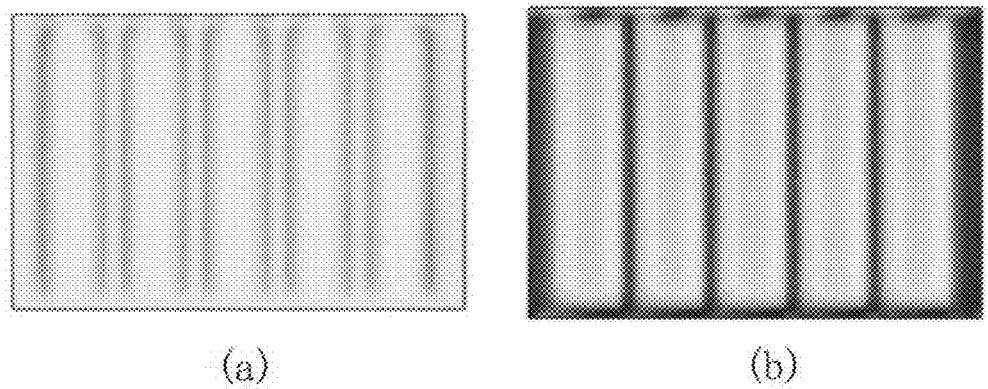
FIG. 12(a) is a simulation diagram of the brightness of the identification area and the non-identification area from the front viewing angle of FIG. 11 in the narrow viewing angle mode.
FIG. 12(b) is a simulation diagram of the brightness of the identification area and the non-identification area from the 45° side viewing angle of FIG. 11 in the narrow viewing angle mode.
Figure 13:
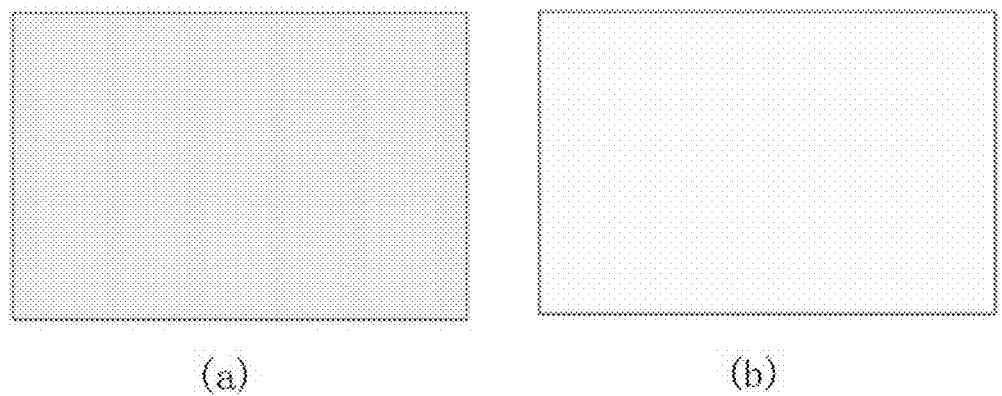
FIG. 13(a) is a simulation diagram of the brightness of the identification area and the non-identification area from the front viewing angle of FIG. 11 in the wide viewing angle mode.
FIG. 13(b) is a simulation diagram of the brightness of the identification area and the non-identification area from the 45° side viewing angle of FIG. 11 in the wide viewing angle mode.
Figure 15:
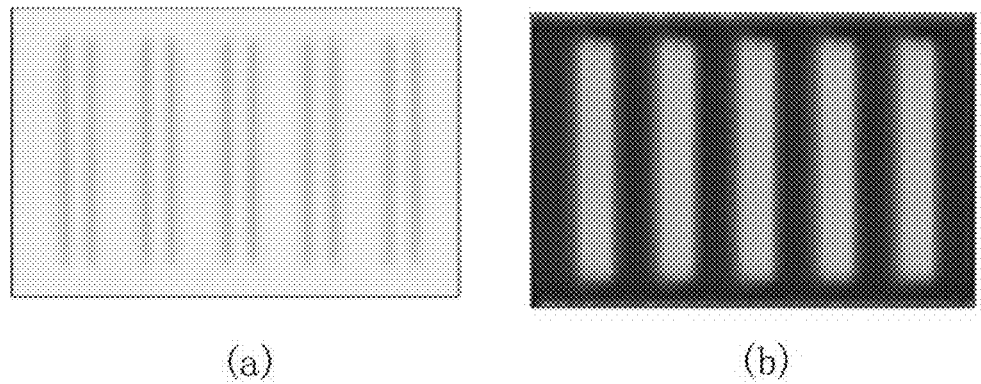
FIG. 15(a) is a simulation diagram of the brightness of the identification area and the non-identification area from the front viewing angle of FIG. 14 in the narrow viewing angle mode.
FIG. 15(b) is a simulation diagram of the brightness of the identification area and the non-identification area from the 45° side viewing angle of FIG. 14 in the narrow viewing angle mode.
Figure 16:
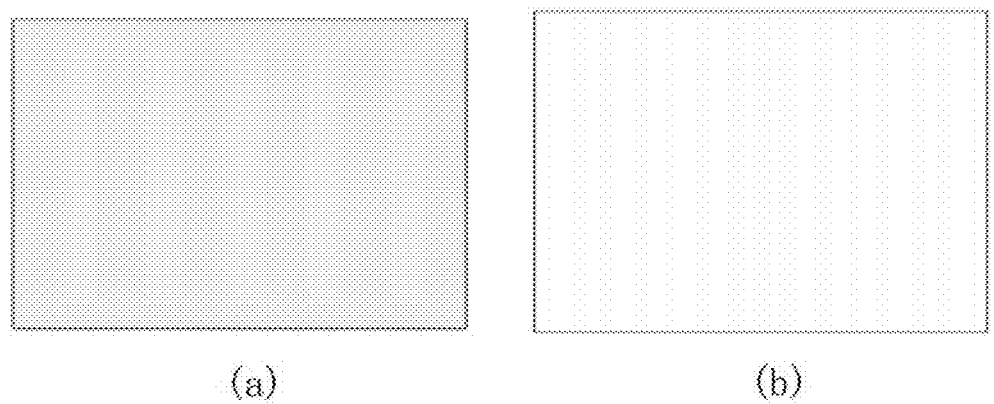
FIG. 16(a) is a simulation diagram of the brightness of the identification area and the non-identification area from the front viewing angle of FIG. 14 in the wide viewing angle mode.
FIG. 16(b) is a simulation diagram of the brightness of the identification area and the non-identification area from the 45° side viewing angle of FIG. 14 in the wide viewing angle mode.

FIG. 12(a) is a simulation diagram of the brightness of the identification area and the non-identification area from the front viewing angle of FIG. 11 in the narrow viewing angle mode; FIG. 12(b) is a simulation diagram of the brightness of the identification area and the non-identification area from the 45° side viewing angle of FIG. 11 in the narrow viewing angle mode; FIG. 13(a) is a simulation diagram of the brightness of the identification area and the non-identification area from the front viewing angle of FIG. 11 in the wide viewing angle mode; FIG. 13(b) is a simulation diagram of the brightness of the identification area and the non-identification area from the 45° side viewing angle of FIG. 11 in the wide viewing angle mode; FIG. 15(a) is a simulation diagram of the brightness of the identification area and the non-identification area from the front viewing angle of FIG. 14 in the narrow viewing angle mode; FIG. 15(b) is a simulation diagram of the brightness of the identification area and the non-identification area from the 45° side viewing angle of FIG. 14 in the narrow viewing angle mode; FIG. 16(a) is a simulation diagram of the brightness of the identification area and the non-identification area from the front viewing angle of FIG. 14 in the wide viewing angle mode; and FIG. 16(b) is a simulation diagram of the brightness of the identification area and the non-identification area from the 45° side viewing angle of FIG. 14 in the wide viewing angle mode.

As shown in FIG. 11-FIG. 16(b), and in combination with Table 1 below:

| Display mode | structure of FIG. 11 | | structure of FIG. 14 | |
| --- | --- | --- | --- | --- |
| | NVA | WVA | NVA | WVA |
| Common viewing angle electrode | 0 V | 0 V | 0 V | 0 V |
| Second viewing angle electrode | 2 V | 0 V | 2 V | 0 V |
| First viewing angle electrode | 1.6 V | 0 V | 1.6 V | 0 V |

-continued

|  | structure of FIG. 11 | | structure of FIG. 14 | |
| --- | --- | --- | --- | --- |
| Display mode | NVA | WVA | NVA | WVA |
| From front viewing angle | FIG. 12(a) | FIG. 13(a) | FIG. 15(a) | FIG. 16(a) |
|  | μ = 90.92% | μ = 101.24% | μ = 94.01% | μ = 101.63% |
| From 45° side viewing angle | FIG. 12(b) | FIG. 13(b) | FIG. 15(b) | FIG. 16(b) |
|  | μ = 597.2% | μ = 101.53% | μ = 291.37% | μ = 100.64% |

In Table 1 and the following tables, NVA represents narrow viewing angle mode, WVA represents wide viewing angle mode, μ represents the ratio of the brightness of the identification area 110 to the brightness of the non-identification area 120, front viewing angle represents the viewing angle perpendicular to the display panel, that is, 0° viewing angle, and 45° side viewing angle represents the viewing angle at 45° with respect to the vertical line of the display panel. The closer μ is to 1, the closer the brightness of the identification area 110 is to the brightness of the non-identification area 120; and the greater μ is deviated from 1, the greater the difference between the brightness of the identification area 110 and the brightness of the non-identification area 120.

As shown in FIG. 11-FIG. 16(b) and Table 1 above, it can be seen that, in the narrow viewing angle mode, when the first viewing angle electrode 121 has a comb electrode structure, if there is a gap between the first viewing angle electrode 121 and the second viewing angle electrode 122 when projected on the second substrate 12, the value of μ can reach about 600% from the side viewing angle, but the value of μ is about 90% from the front viewing angle, such that the LOGO viewed from the side viewing angle is obvious, but the display quality from the front viewing angle may be poor; if the first viewing angle electrode 121 and the second viewing angle electrode 122 when projected on the second substrate 12 are partially overlapped, the LOGO viewed from the side viewing angle is not obvious, but the variation of display quality from the front viewing angle is small.

Figure 18:
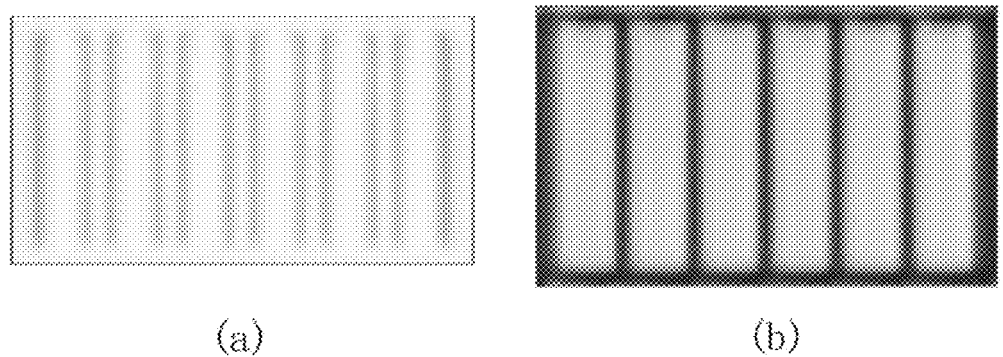
FIG. 18(a) is a simulation diagram of the brightness of the identification area and the non-identification area from the front viewing angle of FIG. 17 in the narrow viewing angle mode.
FIG. 18(b) is a simulation diagram of the brightness of the identification area and the non-identification area from the 45° side viewing angle of FIG. 17 in the narrow viewing angle mode.
Figure 19:
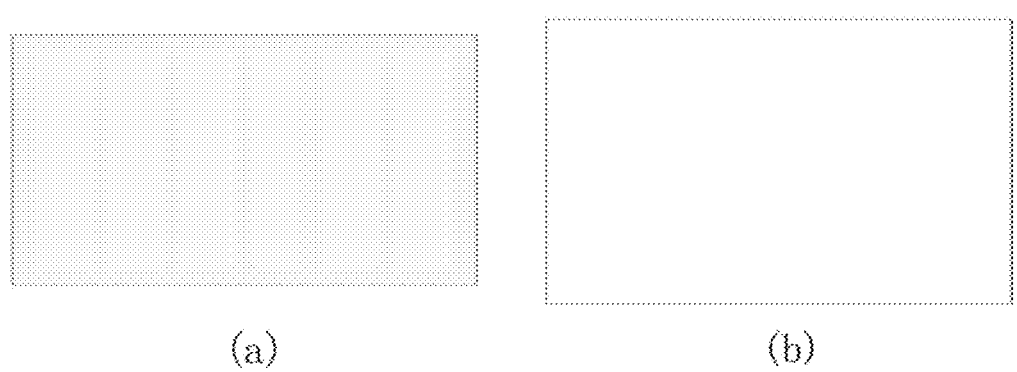
FIG. 19(a) is a simulation diagram of the brightness of the identification area and the non-identification area from the front viewing angle of FIG. 17 in the wide viewing angle mode.
FIG. 19(b) is a simulation diagram of the brightness of the identification area and the non-identification area from the 45° side viewing angle of FIG. 17 in the wide viewing angle mode.
Figure 21:
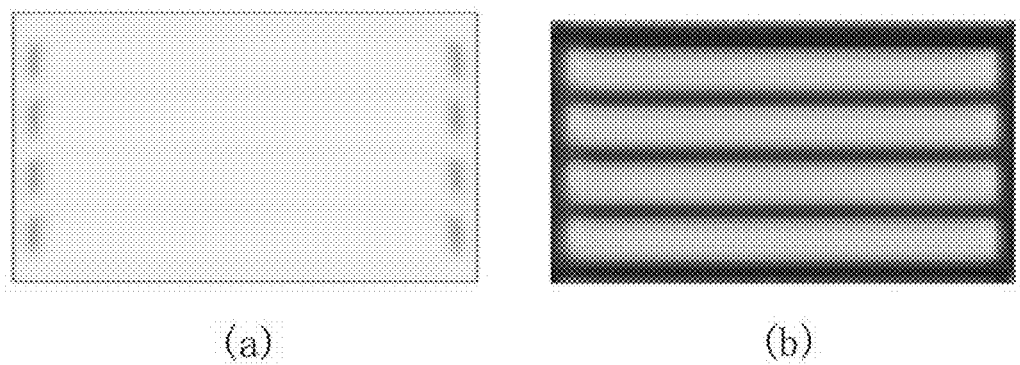
FIG. 21(a) is a simulation diagram of the brightness of the identification area and the non-identification area from the front viewing angle of FIG. 20 in the narrow viewing angle mode.
FIG. 21(b) is a simulation diagram of the brightness of the identification area and the non-identification area from the 45° side viewing angle of FIG. 20 in the narrow viewing angle mode.
Figure 22:
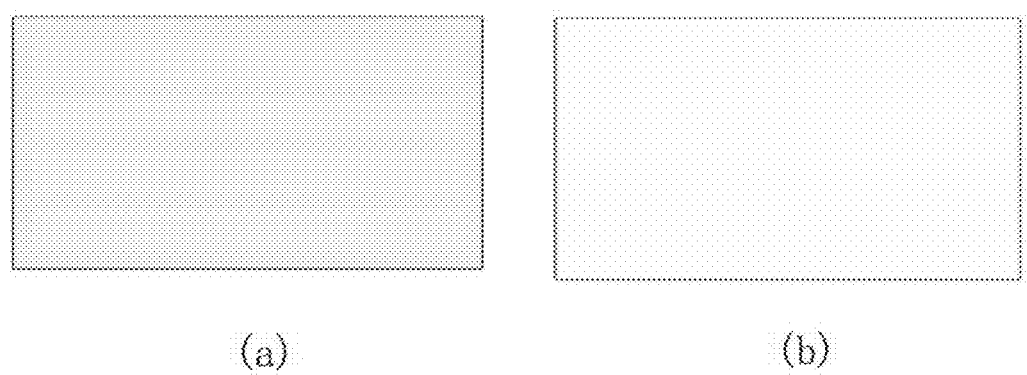
FIG. 22(a) is a simulation diagram of the brightness of the identification area and the non-identification area from the front viewing angle of FIG. 20 in the wide viewing angle mode.
FIG. 22(b) is a simulation diagram of the brightness of the identification area and the non-identification area from the 45° side viewing angle of FIG. 20 in the wide viewing angle mode.

FIG. 18(a) is a simulation diagram of the brightness of the identification area and the non-identification area from the front viewing angle of FIG. 17 in the narrow viewing angle mode; FIG. 18(b) is a simulation diagram of the brightness of the identification area and the non-identification area from the 45° side viewing angle of FIG. 17 in the narrow viewing angle mode; FIG. 19(a) is a simulation diagram of the brightness of the identification area and the non-identification area from the front viewing angle of FIG. 17 in the wide viewing angle mode; FIG. 19(b) is a simulation diagram of the brightness of the identification area and the non-identification area from the 45° side viewing angle of FIG. 17 in the wide viewing angle mode; FIG. 21(a) is a simulation diagram of the brightness of the identification area and the non-identification area from the front viewing angle of FIG. 20 in the narrow viewing angle mode; FIG. 21(b) is a simulation diagram of the brightness of the identification area and the non-identification area from the 45° side viewing angle of FIG. 20 in the narrow viewing angle mode; FIG. 22(a) is a simulation diagram of the brightness of the identification area and the non-identification area from the front viewing angle of FIG. 20 in the wide viewing angle mode; and FIG. 22(b) is a simulation diagram of the brightness of the identification area and the non-identification area from the 45° side viewing angle of FIG. 20 in the wide viewing angle mode.

As shown in FIG. 17-FIG. 22(b), and in combination with Table 2 below:

|  | structure of FIG. 17 | | structure of FIG. 20 | |
| --- | --- | --- | --- | --- |
| Display mode | NVA | WVA | NVA | WVA |
| Common viewing angle electrode | 0 V | 0 V | 0 V | 0 V |
| Second viewing angle electrode | 2 V | 0 V | 2 V | 0 V |
| First viewing angle electrode | 1.6 V | 0 V | 1.6 V | 0 V |
| From front viewing angle | FIG. 18(a) | FIG. 19(a) | FIG. 21(a) | FIG. 22(a) |
|  | μ = 90.92% | μ = 101.30% | μ = 99.18% | μ = 101.32% |
| From 45° side viewing angle | FIG. 18(b) | FIG. 19(b) | FIG. 21(b) | FIG. 22(b) |
|  | μ = 597.2% | μ = 101.45% | μ = 492.28% | μ = 101.37% |

As shown in FIG. 17-FIG. 22(b) and Table 2 above, it can be seen that, in the narrow viewing angle mode, when the first viewing angle electrode 121 is a comb electrode structure arranged horizontally (FIG. 20), the variation of the brightness from the front viewing angle is within 1%, but the value of μ from the side viewing angle is close to 500%, and the overall display effect is good.

Figure 24:
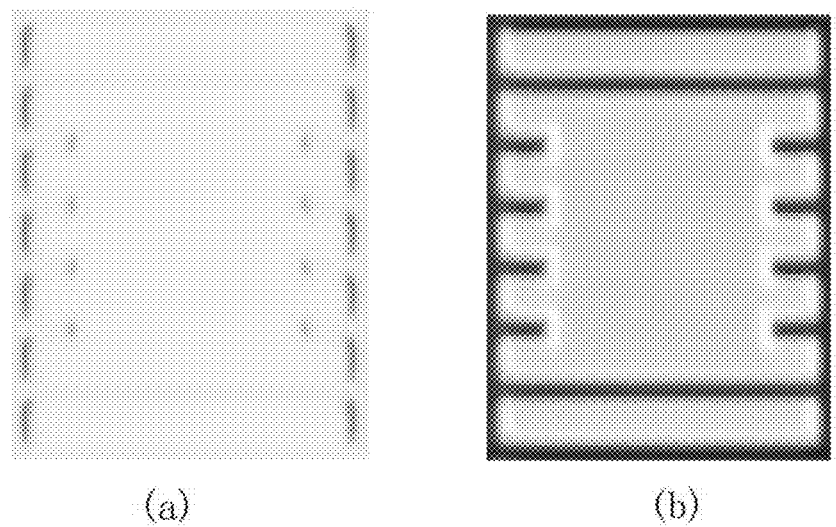
FIG. 24(a) is a simulation diagram of the brightness of the identification area and the non-identification area from the front viewing angle of FIG. 23 in the narrow viewing angle mode.
FIG. 24(b) is a simulation diagram of the brightness of the identification area and the non-identification area from the 45° side viewing angle of FIG. 23 in the narrow viewing angle mode.
Figure 25:
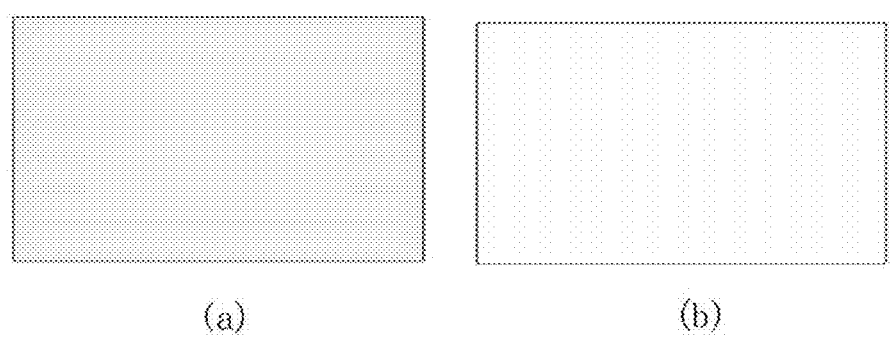
FIG. 25(a) is a simulation diagram of the brightness of the identification area and the non-identification area from the front viewing angle of FIG. 23 in the wide viewing angle mode.
FIG. 25(b) is a simulation diagram of the brightness of the identification area and the non-identification area from the 45° side viewing angle of FIG. 23 in the wide viewing angle mode.

FIG. 24(a) is a simulation diagram of the brightness of the identification area and the non-identification area from the front viewing angle of FIG. 23 in the narrow viewing angle mode; FIG. 24(b) is a simulation diagram of the brightness of the identification area and the non-identification area from the 45° side viewing angle of FIG. 23 in the narrow viewing angle mode; FIG. 25(a) is a simulation diagram of the brightness of the identification area and the non-identification area from the front viewing angle of FIG. 23 in the wide viewing angle mode; FIG. 25(b) is a simulation diagram of the brightness of the identification area and the non-identification area from the 45° side viewing angle of FIG. 23 in the wide viewing angle mode.

As shown in FIG. 23-FIG. 25(b), and in combination with Table 3 below:

|  | structure of FIG. 23 | |
| --- | --- | --- |
| Display mode | NVA | WVA |
| Common viewing angle electrode | 0 V | 0 V |
| Second viewing angle electrode | 2 V | 0 V |
| First viewing angle electrode | 1.6 V | 0 V |
| From front viewing angle | FIG. 24(a) | FIG. 25(a) |
|  | μ = 98.72% | μ = 100.91% |
| From 45° side viewing angle | FIG. 24(b) | FIG. 25(b) |
|  | μ = 710.04% | μ = 101.53% |
|  | (μ = 873.60% at the center area of the LOGO) | |

As shown in FIG. 23-25(b) and Table 3 above, it can be seen that, in the narrow viewing angle mode, when the center of the first viewing angle electrode 121 is a block electrode and the outer periphery of the first viewing angle electrode 121 is a comb electrode (FIG. 23), the value of μ is greater than 700%, and the variation of the brightness from the front viewing angle is about 1%, that is, the variation of the brightness from the front viewing angle is small, and the LOGO display effect from the side viewing angle is better.

FIG. 7 is a schematic diagram of the signal waveform of the display panel of the present application in the wide viewing angle mode; FIG. 8 is a schematic diagram of the display panel of the present application in the narrow viewing angle mode.

The present application also provides a driving method of a display panel with switchable wide and narrow viewing angles. The driving method is used for driving the display panel with switchable wide and narrow viewing angles as described above. The driving method includes:

In the wide viewing angle mode, a first electric signal V1 is applied to the common viewing angle electrode 111, wherein the first electric signal V1 is a DC common voltage signal, and a second electric signal V2 is applied to both the first viewing angle electrode 121 and the second viewing angle electrode 122, and the voltage difference between the second electric signal V2 and the first electric signal V1 is less than a first preset value (for example, less than 1.4V). Preferably, as shown in FIG. 7, the common viewing angle electrode 111, the first viewing angle electrode 121 and the second viewing angle electrode 122 are all applied with 0V DC voltage. There is almost no vertical electric field formed between the common viewing angle electrode 111 and the first viewing angle electrode 121, and between the common viewing angle electrode 111 and the second viewing angle electrode 122. The positive liquid crystal molecules in the first liquid crystal layer 13 will not deflect and remain in the initial lying state (FIG. 1), and at this time, the light adjusting box 10 is in the wide viewing angle mode. Of course, the voltage difference between the second electrical signal V2 and the first electrical signal V1 may also be greater than a second preset value (for example, greater than 5.0V), wherein the second preset value is far greater than the first preset value. A strong vertical electric field will be formed between the common viewing angle electrode 111 and the first viewing angle electrode 121, and between the common viewing angle electrode 111 and the second viewing angle electrode 122 (E2 in FIG. 2), the positive liquid crystal molecules in the first liquid crystal layer 13 deflect greatly and are perpendicular to the first substrate 11 and the second substrate 12, and at this time, the light adjusting box 10 will also be in the wide viewing angle mode.

Since the first viewing angle electrode 121 and the second viewing angle electrode 122 are applied with the same electrical signal in the wide viewing angle mode, the light transmittance of the identification area 110 and the non-identification area 120 are the same from the front viewing angle or from the same side viewing angle, and both the identification area 110 and the non-identification area 120 are in the wide viewing angle mode.

Further, in the wide viewing angle mode, as an embodiment, the common viewing angle electrode 111, the first viewing angle electrode 121 and the second viewing angle electrode 122 are all applied with 0V DC voltage, that is, the first electrical signal V1 and the second electrical signal V2 are both 0V DC voltage.

As shown in FIG. 8, in the narrow viewing angle mode, a first electrical signal V1, namely a DC common voltage signal, is applied to the common viewing angle electrode 111, a third electrical signal V3 is applied to the first viewing angle electrode 121, and a fourth electrical signal V4 is applied to the second viewing angle electrode 122. The amplitudes of the third electrical signal V3 and the fourth electrical signal V4 are different, the voltage difference between the third electrical signal V3 and the first electrical signal V1 and the voltage difference between the fourth electrical signal V4 and the first electrical signal V1 are both greater than a third preset value (for example, greater than 1.5V) and less than a fourth preset value (for example, less than 4.0V), wherein the third preset value is greater than or equal to the first preset value, and the fourth preset value is less than or equal to the second preset value. At this time, a strong vertical electric field (E3 and E4 in FIG. 3) will be formed between the common viewing angle electrode 111 and the first viewing angle electrode 121, and between the common viewing angle electrode 111 and the second viewing angle electrode 122. The positive liquid crystal molecules in the first liquid crystal layer 13 will deflect greatly to be inclined, and the brightness will darken at a large viewing angle, and at this time, the light adjusting box 10 is in the narrow viewing angle mode.

Because in the narrow viewing angle mode, the first viewing angle electrode 121 and the second viewing angle electrode 122 are applied with electric signals with different amplitudes, the deflection angle of the positive liquid crystal molecules in the first liquid crystal layer 13 corresponding to the identification area 110 and the non-identification area 120 is different, the darkening degree of the identification area 110 and the non-identification area 120 from the same side viewing angle is also different, and thus, the light transmittance of the identification area 110 and the non-identification area 120 from the same side viewing angle is different. Therefore, in the narrow viewing angle mode, the LOGO pattern can be highlighted when viewed from the side viewing angle to enhance the brand effect of the product.

Further, in the narrow viewing angle mode, as an embodiment, the amplitude of the third electrical signal V3 and the fourth electrical signal V4 is 1.6V-2.4V, and the third electrical signal V3 and the fourth electrical signal V4 are both AC voltages. The amplitude difference between the third electrical signal V3 and the fourth electrical signal V4 is 0.2V-0.5V. For example, the amplitude of one of the third electrical signal V3 and the fourth electrical signal V4 is 2.0V, and the other one is 1.6V.

Liquid crystal molecules are prone to polarization under the action of a single direction electric field for a long time. In the narrow viewing angle mode, both the third electric signal V3 and the fourth electric signal V4 use AC voltages, such that the direction of the electric field is not a single direction, but is changed continuously, so it can prevent the liquid crystal molecules from polarization under the strong vertical electric field.

Figure 9:
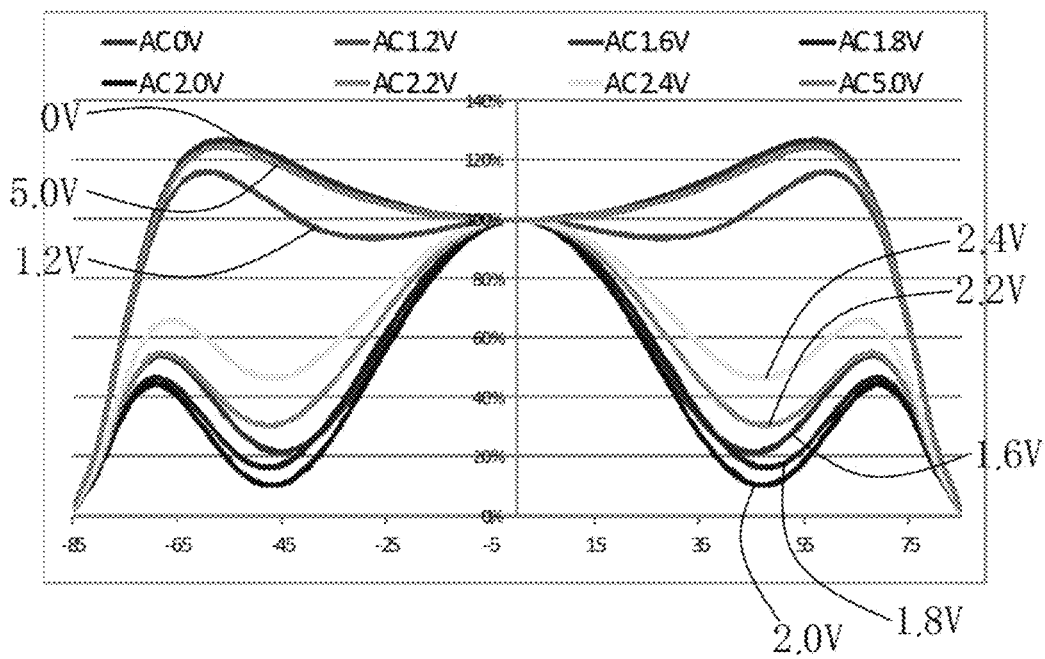
FIG. 9 is a simulation diagram of the light transmittance from different viewing angles of the display panel of the present application under different driving voltages.
Figure 10:
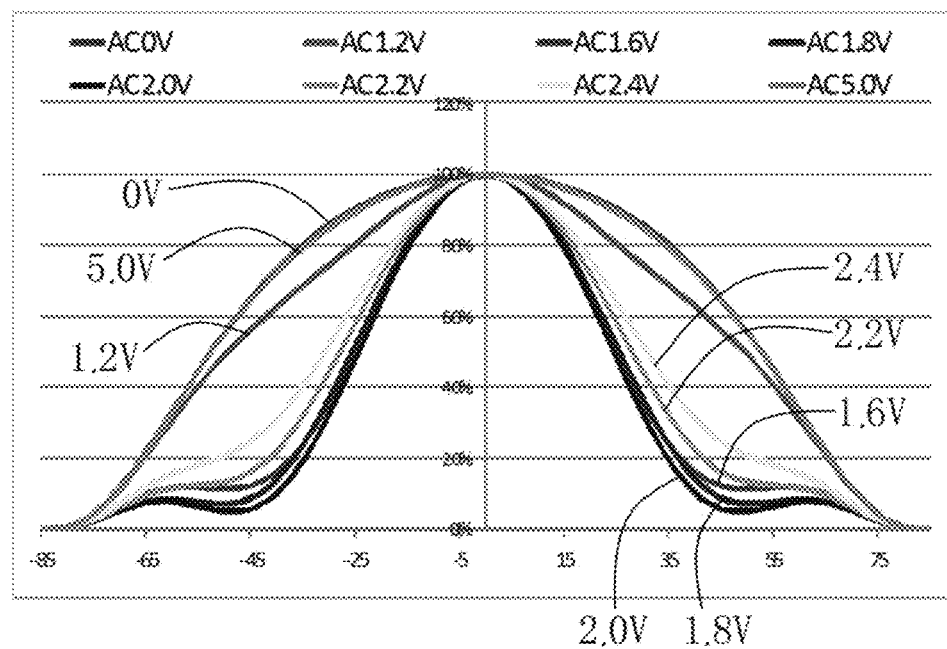
FIG. 10 is another simulation diagram of the light transmittance from different viewing angles of the display panel of the present application under different driving voltages.

FIG. 9 is a simulation diagram of the light transmittance from different viewing angles of the display panel of the present application under different driving voltages; and FIG. 10 is another simulation diagram of the light transmittance from different viewing angles of the display panel of the present application under different driving voltages. As shown in FIGS. 9 and 10, FIG. 9 is the simulation diagram of light transmittance when the alignment direction of the first liquid crystal layer 13 is perpendicular to the light transmission axis of the first polarizer 31 and the second polarizer 32, and FIG. 10 is the simulation diagram of light transmittance when the alignment direction of the first liquid crystal layer 13 is parallel to the light transmission axis of the first polarizer 31 and the second polarizer 32. It can be seen that when the driving voltage applied to the first viewing angle electrode 121 and the second viewing angle electrode 122 is 0V, 1.2V or 5V, the light transmittance from different viewing angles) (−70°~70°) varies slightly, and the wide viewing angle mode is accordingly realized. When the driving voltage applied to the first viewing angle electrode 121 and the second viewing angle electrode 122 is 1.6V, 1.8V, 2.0V, 2.2V or 2.4V, the light transmittance from different large viewing angles (−70°~30° and 30°~70°) varies greatly, but the light transmittance from the front viewing angles (−30°~30°) varies slightly, and the narrow viewing angle mode is accordingly realized. However, in the narrow viewing angle mode, when the driving voltage applied to the first viewing angle electrode 121 and the second viewing angle electrode 122 is 2.4V or 2.2V, the light transmittance from the side viewing angle is comparatively large, which will cause the effect in the narrow viewing angle mode to be reduced. Therefore, in the narrow viewing angle mode, the driving voltage applied to the first viewing angle electrode 121 and the second viewing angle electrode 122 is preferably 2.0V, 1.8V or 1.6V, for example, one of the first viewing angle electrode 121 and the second viewing angle electrode 122 is applied with the driving voltage of 2.0V, while the other one is applied with the driving voltage of 1.6V. If a brighter LOGO pattern needs to be displayed, the first viewing angle electrode 121 is applied with the driving voltage of 1.6V; if a darker LOGO pattern needs to be displayed, the first viewing angle electrode 121 is applied with the driving voltage of 2.0V. Of course, the specific voltage values may also be adjusted according to the actual situation. In the case of good narrow viewing angle effect, it is preferred to use electrical signals that can make maximal difference in brightness between the identification area 110 and the non-identification area 120.

Figure 28:
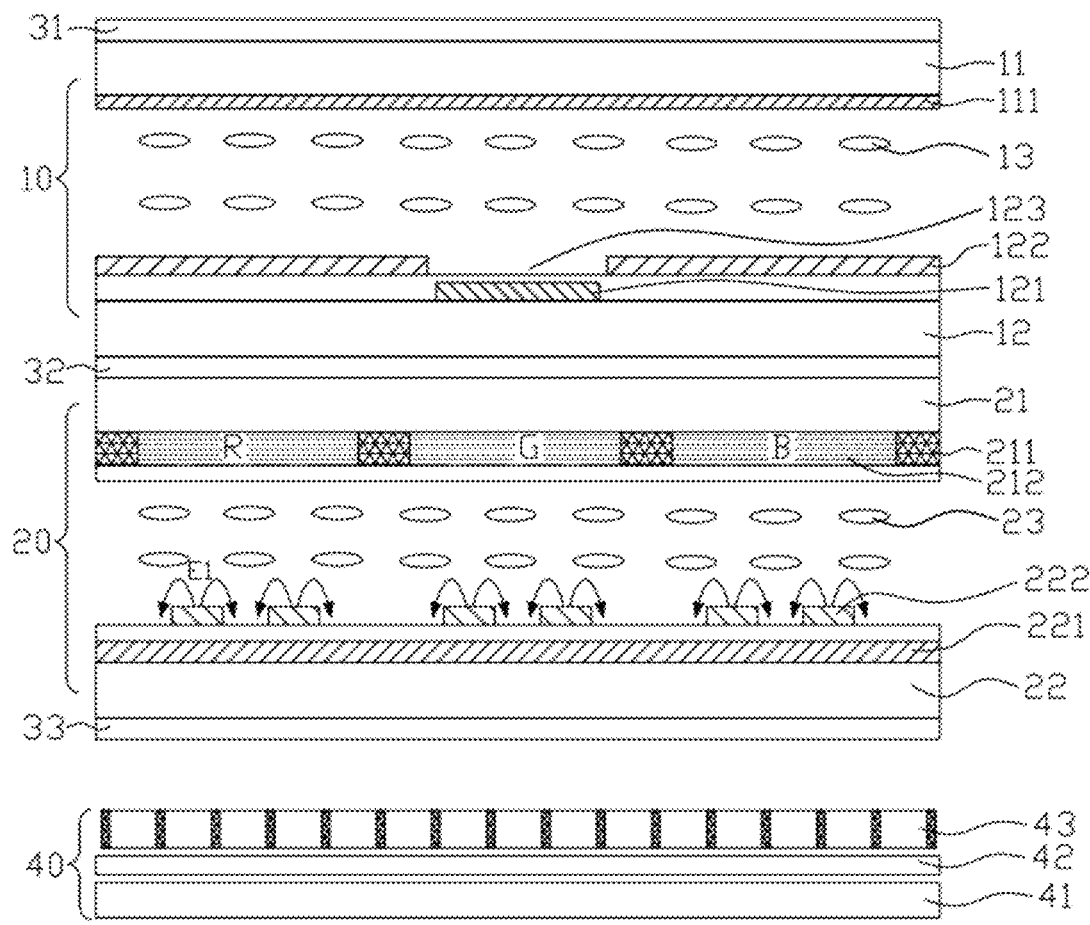
FIG. 28 is a schematic diagram of the structure of the display device of the present application.

FIG. 28 is a schematic diagram of the structure of the display device of the present application. As shown in FIG. 28, the present application also provides a display device, including a display panel with switchable wide and narrow viewing angles as described above, and a backlight module 40 which is located below the display panel to provide backlight source for the display panel. Of course, if the display box 20 uses a self-illuminated display, the display device does not need to set additional backlight source.

The backlight module 40 includes a backlight source 41 and an anti-peeping layer 43. The anti-peeping layer 43 is used to narrow the range of light emission angle. A brightening film 42 is also provided between the backlight source 41 and the anti-peeping layer 43. The brightening film 42 increases the brightness of the backlight module 40. Specifically, the anti-peeping layer 43 is equivalent to a miniature louver structure, which can block the light with larger incidence angles, make the light with smaller incidence angles pass through, and make the angle range of the light passing through the anti-peeping layer 43 narrower. The anti-peeping layer 43 includes a plurality of parallel light barrier walls and a light penetrating hole between two adjacent light barrier walls, and the two sides of the light barrier wall are provided with light absorbing materials. Of course, the backlight source 41 may also use a concentrated backlight source, so it is not necessary to set the anti-peeping layer 43, but the concentrated backlight source may be more expensive than the conventional backlight source.

The backlight module 40 may be an edge-type backlight module or a direct-type backlight module. Preferably, the backlight module 40 adopts the collimated backlight (CBL) mode, which can collect light and ensure the display effect.

Figure 29:
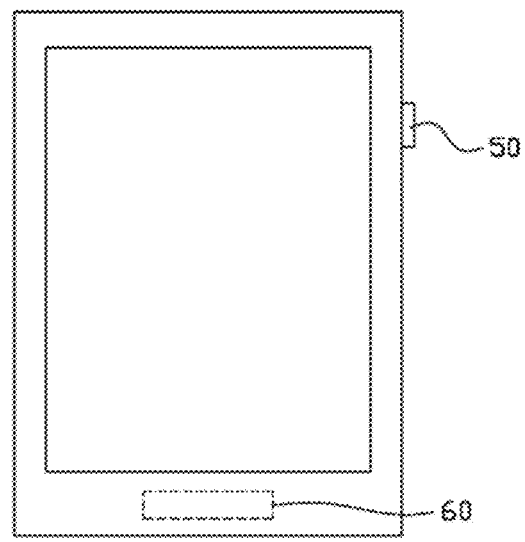
FIG. 29 is a schematic plan view of the display device of the present application.
Figure 30:
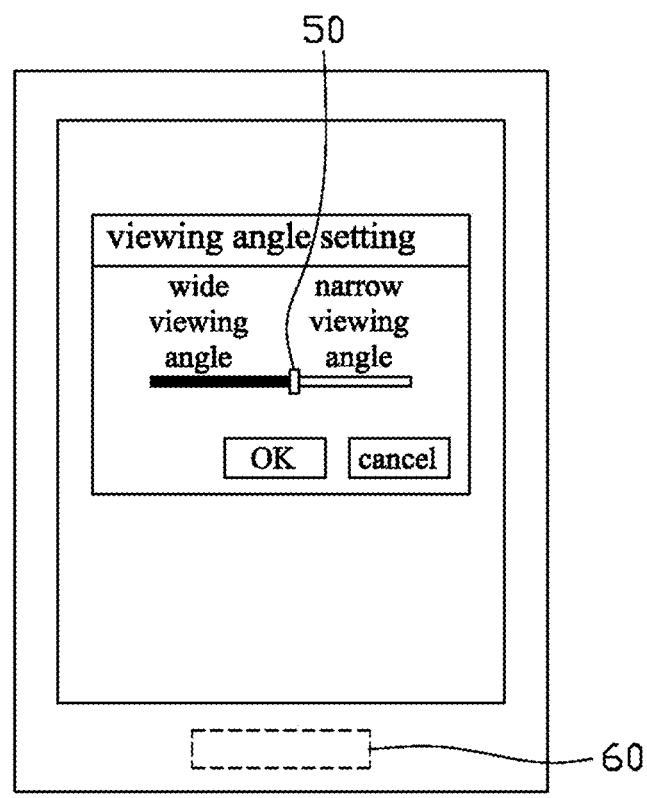
FIG. 30 is another schematic plan view of the display device of the present application.

FIG. 29 is a schematic plan view of the display device of the present application, and FIG. 30 is another schematic plan view of the display device of the present application. Referring to FIGS. 29 and 30, the display device is provided with a viewing angle switch button 50 for users to send a viewing angle switch request to the display device. The viewing angle switch button 50 may be a mechanical key (as shown in FIG. 29), or a software control or application program (APP) to realize the switching function (as shown in FIG. 30, for example, the wide and narrow viewing angles can be set through the slider). When the user needs to switch between a wide viewing angle mode and a narrow viewing angle mode, the user can send a request for switch viewing angle to the display device by operating the viewing angle switch button 50. Finally, different electrical signals are applied to the common viewing angle electrode 111, the first viewing angle electrode 121 and the second viewing angle electrode 122 under control by the driver chip 60, such that the display device can switch between a wide viewing angle mode and a narrow viewing angle mode. When switching to the wide viewing angle mode, the display device adopts the driving method corresponding to the wide viewing angle mode. When switching to the narrow viewing angle mode, the display device adopts the driving method corresponding to the narrow viewing angle mode. Therefore, the display device in the embodiment of the present application has strong operational flexibility and convenience, and achieves a multi-function display device integrating entertainment video and privacy.

In this document, the directional terms such as "up", "down", "left", "right", "front" and "back" are defined by the positions of the structures in the drawings and the positions between the structures, and are only for clearly and conveniently expressing technical solutions. It should be understood that the use of the directional terms should not limit the scope of protection claimed in this application. It should also be understood that the terms "first" and "second", etc. used herein are only used to distinguish elements, and are not used to limit the number and order.

The above descriptions are only preferred embodiments of the present application, and do not limit the present application in any form. Although the present application has been disclosed above with preferred embodiments, it is not intended to limit the present application. The persons skilled in the art may make some changes or modifications by using the technical content disclosed above, and if they do not depart from the technical content of the present application, any simple modifications, equivalent changes and modifications made to the above embodiments still fall within the protection scope of the technical solution of the present application.

Industrial Applicability

The first viewing angle electrode and the second viewing angle electrode are provided in the light adjusting box, and the first viewing angle electrode is a patterned structure. In the narrow viewing angle mode, the first viewing angle electrode and the second viewing angle electrode are applied with electric signals with different amplitudes, the light transmittance of the identification area and the non-identification area is different from the same side viewing angle, such that the brightness of the identification area and the non-identification area is different from the same side viewing angle, the LOGO pattern in the corresponding identification area, namely the trademark pattern, can be seen from the side viewing angle, so as to enhance the brand effect. However, the brightness difference between the identification area and the non-identification area is not obvious from the front viewing angle, and the normally displayed picture can be seen.

What is claimed is:

1. A display panel with switchable wide and narrow viewing angles, wherein the display panel is provided with a patterned identification area and a non-identification area, and the display panel comprises a light adjusting box and a display box which are stacked with one on another;
    the light adjusting box comprises a first substrate, a second substrate arranged opposite to the first substrate and a first liquid crystal layer arranged between the first substrate and the second substrate, the side of the first substrate facing the first liquid crystal layer is provided with a common viewing angle electrode, the side of the second substrate facing the first liquid crystal layer is provided with a first viewing angle electrode and a second viewing angle electrode which are matched with the common viewing angle electrode, the first viewing angle electrode and the second viewing angle electrode are insulated and separated from each other, the first viewing angle electrode is located correspondingly in the identification area, and the second viewing angle electrode is located correspondingly in the non-identification area;
    wherein the second viewing angle electrode is provided with an opening corresponding to the first viewing angle electrode, and the pattern of the opening is the same as that of the first viewing angle electrode;
    in the wide viewing angle mode, the first viewing angle electrode and the second viewing angle electrode are applied with electric signals with the same amplitude, and the light transmittance of the identification area and the non-identification area from the same side viewing angle is the same;
    in the narrow viewing angle mode, the first viewing angle electrode and the second viewing angle electrode are applied with electric signals with different amplitudes, and the light transmittance of the identification area and the non-identification area from the same side viewing angle is different.

2. The display panel with switchable wide and narrow viewing angles as claimed in claim 1, wherein the identification area is located at the center of the display panel.

3. The display panel with switchable wide and narrow viewing angles as claimed in claim 1, wherein the second viewing angle electrode and the first viewing angle electrode are located on the same layer; or, the second viewing angle electrode and the first viewing angle electrode are located at different layers.

4. The display panel with switchable wide and narrow viewing angles as claimed in claim 1, wherein there is a gap between the first viewing angle electrode and the second viewing angle electrode when projected on the second substrate.

5. The display panel with switchable wide and narrow viewing angles as claimed in claim 1, wherein the first viewing angle electrode and the second viewing angle electrode when projected on the second substrate are partially overlapped.

6. The display panel with switchable wide and narrow viewing angles as claimed in claim 1, wherein the first viewing angle electrode is a comb electrode, and the second viewing angle electrode is a comb electrode matched with the first viewing angle electrode in the area near the first viewing angle electrode.

7. The display panel with switchable wide and narrow viewing angles as claimed in claim 1, wherein both the first viewing angle electrode and the second viewing angle electrode are block electrodes.

8. The display panel with switchable wide and narrow viewing angles as claimed in claim 1, wherein the center of the first viewing angle electrode is a block electrode, the outer periphery of the first viewing angle electrode is a comb electrode, and the second viewing angle electrode is a comb electrode matched with the first viewing angle electrode in the area near the first viewing angle electrode.

9. The display panel with switchable wide and narrow viewing angles as claimed in claim 1, wherein the light adjusting box is provided with a first signal line electrically connected with the common viewing angle electrode, a second signal line electrically connected with the first viewing angle electrode, and a third signal line electrically connected with the second viewing angle electrode, wherein the first signal line, the second signal line and the third signal line are all led out around the edges of the light adjusting box; or, the first signal line and the third signal line are both led out around the edges of the light adjusting box, and the second signal line is directly led out from the first viewing angle electrode.

10. The display panel with switchable wide and narrow viewing angles as claimed in claim 1, wherein the display box comprises a color film substrate, an array substrate arranged opposite to the color film substrate, and a second liquid crystal layer arranged between the color film substrate and the array substrate; a first polarizer is arranged on the side of the light adjusting box away from the display box, a second polarizer is arranged between the light adjusting box and the display box, and a third polarizer is arranged on the side of the display box away from the light adjusting box, wherein the light transmission axis of the first polarizer is parallel to the light transmission axis of the second polarizer, and the light transmission axis of the third polarizer is perpendicular to the light transmission axis of the second polarizer.

11. A driving method of a display panel with switchable wide and narrow viewing angles, wherein the driving method is configured for driving the display panel with switchable wide and narrow viewing angles as claimed in claim 1, and the driving method comprises:
    in the wide viewing angle mode, a first electrical signal is applied to the common viewing angle electrode, and a second electrical signal is applied to both the first viewing angle electrode and the second viewing angle electrode, wherein the voltage difference between the second electrical signal and the first electrical signal is less than a first preset value or greater than a second preset value, and the light transmittance of the identification area and the non-identification area from the same side viewing angle is the same;

in the narrow viewing angle mode, a first electrical signal is applied to the common viewing angle electrode, a third electrical signal is applied to the first viewing angle electrode, and a fourth electrical signal is applied to the second viewing angle electrode, wherein the amplitudes of the third electrical signal and the fourth electrical signal are different, the voltage difference between the third electrical signal and the first electrical signal and the voltage difference between the fourth electrical signal and the first electrical signal are greater than a third preset value and less than a fourth preset value, and the light transmittance of the identification area and the non-identification area is different from the same side viewing angle;

wherein the second preset value is greater than the first preset value, the third preset value is greater than or equal to the first preset value, and the fourth preset value is less than or equal to the second preset value.

12. The driving method of the display panel with switchable wide and narrow viewing angles as claimed in claim 11, wherein the first electrical signal and the second electrical signal are both 0V DC voltage.

13. The driving method of the display panel with switchable wide and narrow viewing angles as claimed in claim 11, wherein the amplitudes of the third electrical signal and the fourth electrical signal are 1.6V -2.4V.

14. The driving method of the display panel with switchable wide and narrow viewing angles as claimed in claim 11, wherein the third electrical signal and the fourth electrical signal are both AC voltages.

15. The driving method of the display panel with switchable wide and narrow viewing angles as claimed in claim 11, wherein the amplitude difference between the third electrical signal and the fourth electrical signal is 0.2V-0.5V.

16. A display device, comprising the display panel with switchable wide and narrow viewing angles as claimed in claim 1.

* * * * *